United States Patent
Iyer et al.

(10) Patent No.: US 10,008,317 B2
(45) Date of Patent: Jun. 26, 2018

(54) VOLTAGE OR IMPEDANCE-INJECTION METHOD USING TRANSFORMERS WITH MULTIPLE SECONDARY WINDINGS FOR DYNAMIC POWER FLOW CONTROL

(71) Applicant: Smart Wires Inc., San Francisco, CA (US)

(72) Inventors: Amrit Iyer, San Leandro, CA (US); Debrup Das, Union City, CA (US); David Munguia, San Jose, CA (US); Arthur Kelley, Napa, CA (US); Haroon Inam, San Jose, CA (US); Joe Carrow, Napa, CA (US); Ali Farahani, Orange, CA (US)

(73) Assignee: Smart Wires Inc., Union City, CA (US)

( * ) Notice: Subject to any disclaimer, the term of this patent is extended or adjusted under 35 U.S.C. 154(b) by 32 days.

(21) Appl. No.: 15/069,785

(22) Filed: Mar. 14, 2016

(65) Prior Publication Data
US 2017/0163245 A1 Jun. 8, 2017

Related U.S. Application Data

(60) Provisional application No. 62/264,744, filed on Dec. 8, 2015.

(51) Int. Cl.
*H01F 27/06* (2006.01)
(52) U.S. Cl.
CPC .................... *H01F 27/06* (2013.01)
(58) Field of Classification Search
CPC .... G01R 15/18; G01R 19/0092; G01R 21/08; G01R 5/186; H02J 3/26; H02H 9/02; H02M 7/003; H01F 27/06
See application file for complete search history.

(56) References Cited

U.S. PATENT DOCUMENTS

| | | | |
|---|---|---|---|
| 2,237,812 | A | 4/1941 | De Blieux |
| 2,551,841 | A | 5/1951 | Kepple et al. |

(Continued)

FOREIGN PATENT DOCUMENTS

| | | |
|---|---|---|
| CH | 660094 | 3/1987 |
| CN | 103256337 | 8/2013 |

(Continued)

OTHER PUBLICATIONS

"International Search Report and Written Opinion of the International Searching Authority dated Feb. 2, 2017; International Application No. PCT/US2016/062358", (Feb. 2, 2017).

(Continued)

*Primary Examiner* — Kyle J Moody
(74) *Attorney, Agent, or Firm* — Womble Bond Dickinson (US) LLP (57) ABSTRACT

This patent discloses an active impedance-injection module for dynamic line balancing of a high-voltage (HV) transmission line. The impedance-injection module comprises a plurality of transformers each having a primary winding in series with a HV transmission line. Each transformer also has secondary windings, each connected to an individual electronic converter. The plurality of secondary windings are electrically isolated from the associated primary winding and extract power from the HV transmission line for operation of the converters and other circuits connected to the secondary windings. The active impedance-injection module is enabled to generate a controlled impedance, inductive or capacitive, to be impressed on the HV transmission line. A plurality of active impedance-injection modules spatially distributed on a HV transmission line are enabled to inject a controlled cumulative impedance on a HV transmission line while limiting the capacity of individual converters to that achievable with practical electronic components.

25 Claims, 8 Drawing Sheets

(56) References Cited

U.S. PATENT DOCUMENTS

| | | |
|---|---|---|
| 3,556,310 A | 1/1971 | Loukotsky |
| 3,704,001 A | 11/1972 | Sloop |
| 3,750,992 A | 8/1973 | Johnson |
| 3,913,003 A | 10/1975 | Felkel |
| 4,025,824 A | 5/1977 | Cheatham |
| 4,057,736 A | 11/1977 | Jeppson |
| 4,103,853 A | 8/1978 | Bannan |
| 4,164,345 A | 8/1979 | Arnold et al. |
| 4,200,899 A | 4/1980 | Volman et al. |
| 4,277,639 A | 7/1981 | Olsson |
| 4,286,207 A | 8/1981 | Spreadbury et al. |
| 4,323,722 A | 4/1982 | Winkelman |
| 4,367,512 A | 1/1983 | Fujita |
| 4,514,950 A | 5/1985 | Goodson, Jr. |
| 4,562,360 A | 12/1985 | Fujimoto |
| 4,577,826 A | 3/1986 | Bergstrom et al. |
| 4,710,850 A | 12/1987 | Jahn et al. |
| 4,821,138 A | 4/1989 | Nakano et al. |
| 4,903,927 A | 2/1990 | Farmer |
| 5,006,846 A | 4/1991 | Granville et al. |
| 5,023,768 A | 6/1991 | Collier |
| 5,032,738 A | 7/1991 | Vithayathil |
| 5,193,774 A | 3/1993 | Rogers |
| 5,461,300 A | 10/1995 | Kappenman |
| 5,469,044 A | 11/1995 | Gyugyi et al. |
| 5,610,501 A | 3/1997 | Nelson et al. |
| 5,648,888 A | 7/1997 | Le Francois et al. |
| 5,844,462 A | 12/1998 | Rapoport et al. |
| 5,884,886 A | 3/1999 | Hageli |
| 5,886,888 A | 3/1999 | Akamatsu et al. |
| 5,986,617 A | 11/1999 | McLellan |
| 6,088,249 A | 7/2000 | Adamson |
| 6,134,105 A | 10/2000 | Lueker |
| 6,147,581 A | 11/2000 | Rancourt et al. |
| 6,215,653 B1 | 4/2001 | Cochran et al. |
| 6,233,137 B1 | 5/2001 | Kolos et al. |
| 6,335,613 B1 | 1/2002 | Sen et al. |
| 6,486,569 B2 | 11/2002 | Couture |
| 6,727,604 B2 | 4/2004 | Couture |
| 6,831,377 B2 | 12/2004 | Yampolsky et al. |
| 6,895,373 B2 | 5/2005 | Garcia et al. |
| 6,914,195 B2 | 7/2005 | Archambault et al. |
| 7,090,176 B2 | 8/2006 | Chavot et al. |
| 7,091,703 B2 | 8/2006 | Folts et al. |
| 7,105,952 B2 * | 9/2006 | Divan ............ H01F 30/16 307/98 |
| 7,193,338 B2 | 3/2007 | Ghali |
| 7,352,564 B2 | 4/2008 | Courtney |
| 7,460,931 B2 | 12/2008 | Jacobson |
| 7,642,757 B2 | 1/2010 | Yoon et al. |
| 7,688,043 B2 | 3/2010 | Toki et al. |
| 7,834,736 B1 | 11/2010 | Johnson et al. |
| 7,835,128 B2 * | 11/2010 | Divan ............ H02J 3/1807 361/93.9 |
| 7,932,621 B1 | 4/2011 | Spellman |
| 8,019,484 B2 | 9/2011 | Korba et al. |
| 8,249,836 B2 | 8/2012 | Yoon et al. |
| 8,270,558 B2 | 9/2012 | Dielissen |
| 8,310,099 B2 | 11/2012 | Engel et al. |
| 8,401,709 B2 | 3/2013 | Cherian et al. |
| 8,441,778 B1 | 5/2013 | Ashmore |
| 8,497,592 B1 | 7/2013 | Jones |
| 8,680,720 B2 | 3/2014 | Schauder et al. |
| 8,681,479 B2 | 3/2014 | Englert et al. |
| 8,816,527 B1 * | 8/2014 | Ramsay ............ H02J 3/26 307/14 |
| 8,825,218 B2 | 9/2014 | Cherian et al. |
| 8,867,244 B2 | 10/2014 | Trainer et al. |
| 8,872,366 B2 | 10/2014 | Campion et al. |
| 8,890,373 B2 | 11/2014 | Savolainen et al. |
| 8,896,988 B2 | 11/2014 | Subbaiahthever et al. |
| 8,922,038 B2 | 12/2014 | Bywaters et al. |
| 8,957,752 B2 | 2/2015 | Sharma et al. |
| 8,996,183 B2 | 3/2015 | Forbes, Jr. |
| 9,099,893 B2 | 8/2015 | Schmiegel et al. |
| 9,124,100 B2 | 9/2015 | Ukai et al. |
| 9,124,138 B2 | 9/2015 | Mori et al. |
| 9,130,458 B2 | 9/2015 | Crookes et al. |
| 9,178,456 B2 | 11/2015 | Smith et al. |
| 9,185,000 B2 | 11/2015 | Mabilleau et al. |
| 9,207,698 B2 | 12/2015 | Forbes, Jr. |
| 9,217,762 B2 * | 12/2015 | Kreikebaum ........ G01R 15/202 |
| 9,246,325 B2 | 1/2016 | Coca Figuerola et al. |
| 9,325,173 B2 | 4/2016 | Varma et al. |
| 9,331,482 B2 | 5/2016 | Huang |
| 9,659,114 B2 | 5/2017 | He et al. |
| 2002/0005668 A1 | 1/2002 | Couture |
| 2002/0042696 A1 | 4/2002 | Garcia et al. |
| 2003/0006652 A1 | 1/2003 | Couture |
| 2003/0098768 A1 | 5/2003 | Hoffmann et al. |
| 2004/0217836 A1 | 11/2004 | Archambault et al. |
| 2005/0052801 A1 | 3/2005 | Ghali |
| 2005/0073200 A1 | 4/2005 | Divan et al. |
| 2005/0194944 A1 | 9/2005 | Folts et al. |
| 2005/0205726 A1 | 9/2005 | Chavot et al. |
| 2006/0085097 A1 | 4/2006 | Courtney |
| 2007/0135972 A1 | 6/2007 | Jacobson |
| 2007/0250217 A1 | 10/2007 | Yoon et al. |
| 2008/0103737 A1 | 5/2008 | Yoon et al. |
| 2008/0157728 A1 | 7/2008 | Toki et al. |
| 2008/0177425 A1 | 7/2008 | Korba et al. |
| 2008/0278976 A1 | 11/2008 | Schneider et al. |
| 2008/0310069 A1 | 12/2008 | Divan et al. |
| 2009/0243876 A1 | 10/2009 | Lilien et al. |
| 2009/0281679 A1 | 11/2009 | Taft et al. |
| 2010/0026275 A1 | 2/2010 | Walton |
| 2010/0177450 A1 | 7/2010 | Holcomb et al. |
| 2010/0213765 A1 | 8/2010 | Engel et al. |
| 2010/0302744 A1 | 12/2010 | Englert et al. |
| 2011/0060474 A1 | 3/2011 | Schmiegel et al. |
| 2011/0095162 A1 | 4/2011 | Parduhn et al. |
| 2011/0106321 A1 | 5/2011 | Cherian et al. |
| 2011/0172837 A1 | 7/2011 | Forbes, Jr. |
| 2012/0105023 A1 | 5/2012 | Schauder et al. |
| 2012/0146335 A1 | 6/2012 | Bywaters et al. |
| 2012/0205981 A1 | 8/2012 | Varma et al. |
| 2012/0242150 A1 | 9/2012 | Ukai et al. |
| 2012/0255920 A1 | 10/2012 | Shaw et al. |
| 2012/0293920 A1 | 11/2012 | Subbaiahthever et al. |
| 2013/0002032 A1 | 1/2013 | Mori et al. |
| 2013/0033103 A1 | 2/2013 | McJunkin et al. |
| 2013/0044407 A1 | 2/2013 | Byeon et al. |
| 2013/0094264 A1 | 4/2013 | Crookes et al. |
| 2013/0128636 A1 | 5/2013 | Trainer et al. |
| 2013/0166085 A1 | 6/2013 | Cherian et al. |
| 2013/0169044 A1 | 7/2013 | Stinessen et al. |
| 2013/0182355 A1 | 7/2013 | Coca Figuerola et al. |
| 2013/0184894 A1 | 7/2013 | Sakuma et al. |
| 2013/0200617 A1 | 8/2013 | Smith et al. |
| 2013/0277082 A1 | 10/2013 | Hyde et al. |
| 2013/0345888 A1 | 12/2013 | Forbes, Jr. |
| 2014/0025217 A1 | 1/2014 | Jin et al. |
| 2014/0032000 A1 | 1/2014 | Chandrashekhara et al. |
| 2014/0111297 A1 | 4/2014 | Earhart et al. |
| 2014/0129195 A1 | 5/2014 | He et al. |
| 2014/0132229 A1 | 5/2014 | Huang |
| 2014/0153383 A1 | 6/2014 | Mabilleau et al. |
| 2014/0188689 A1 | 7/2014 | Kalsi et al. |
| 2014/0203640 A1 | 7/2014 | Stinessen |
| 2014/0210213 A1 | 7/2014 | Campion et al. |
| 2014/0246914 A1 | 9/2014 | Chopra et al. |
| 2014/0247554 A1 | 9/2014 | Sharma et al. |
| 2014/0268458 A1 | 9/2014 | Luciani et al. |
| 2014/0312859 A1 | 10/2014 | Ramsay et al. |
| 2014/0327305 A1 | 11/2014 | Ramsay et al. |
| 2015/0012146 A1 | 1/2015 | Cherian et al. |
| 2015/0029764 A1 | 1/2015 | Peng |
| 2015/0051744 A1 | 2/2015 | Mitra |
| 2015/0184415 A1 | 7/2015 | Bushore |
| 2015/0226772 A1 | 8/2015 | Kreikebaum et al. |
| 2015/0244307 A1 | 8/2015 | Cameron |
| 2015/0270689 A1 | 9/2015 | Gibson et al. |
| 2016/0036231 A1 | 2/2016 | Ramsay et al. |

(56) References Cited

U.S. PATENT DOCUMENTS

| | | | |
|---|---|---|---|
| 2016/0036341 | A1 | 2/2016 | Jang et al. |
| 2017/0163036 | A1* | 6/2017 | Munguia ............. H01F 27/2823 |
| 2017/0169928 | A1* | 6/2017 | Carrow .................. H01F 27/06 |

FOREIGN PATENT DOCUMENTS

| | | |
|---|---|---|
| CN | 203668968 | 6/2014 |
| JP | 2002-199563 | 7/2002 |
| JP | 2005-045888 | 2/2005 |
| JP | 2015-086692 | 5/2015 |
| KR | 10-1053514 | 8/2011 |
| WO | WO-2008/082820 | 7/2008 |
| WO | WO-2014/035881 | 3/2014 |
| WO | WO-2014/074956 | 5/2014 |
| WO | WO-2014/099876 | 6/2014 |
| WO | WO-2015/074538 | 5/2015 |
| WO | WO-2015/119789 | 8/2015 |

OTHER PUBLICATIONS

"International Search Report and Written Opinion of the International Searching Authority dated Feb. 2, 2017; International Application No. PCT/US2016/062620", (Feb. 2, 2017).
"International Search Report and Written Opinion of the International Searching Authority dated Mar. 2, 2017; International Application No. PCT/US2016/061009", (Mar. 2, 2017).
"Invitation of the International Searching Authority to Pay Additional Fees dated Dec. 15, 2016; International Application No. PCT/US2016/061009", (Dec. 15, 2016).
Amin, S. M., et al., "Toward a Smart Grid: Power Delivery for the 21st Century", *IEEE power & energy magazine*, vol. 3, No. 5, (Sep./Oct. 2005), pp. 34-41.
Angeladas, Emmanouil , "High Voltage Substations Overview (part 1)", *Siemens*, (Jan. 24, 2013), pp. 1-8.
Aquino-Lugo, Angel A., "Distributed and Decentralized Control of the Power Grid", *Ph.D. Dissertation, University of Illinois at Urbana-Champaign*, (2010), 172 pp. total.
Dash, P. K., et al., "Digital Protection of Power Transmission Lines in the Presence of Series Connected FACTS Devices", *IEEE Power Engineering Society Winter Meeting*, (2000), pp. 1967-1972.
Divan, D. M., "Nondissipative Switched Networks for High-Power Applications", *Electronics Letters*, vol. 20, No. 7, (Mar. 29, 1984), pp. 277-279.
Funato, Hirohito , et al., "Realization of Negative Inductance Using Variable Active-Passive Reactance (VAPAR)", *IEEE Transactions on Power Electronics*, vol. 12, No. 4, (Jul. 1997), pp. 589-596.
Gyugyi, Laszlo , et al., "Status Synchronous Series Compensator: A Solid-State Approach to the Series Compensation of Transmission Lines", *IEEE Transactions on Power Delivery*, vol. 12, No. 1, (Jan. 1997), pp. 406-417.
Gyugyi, Laszlo , et al., "The Interline Power Flow Controller Concept: A New Approach to Power Flow Management in Transmission Systems", *IEEE Transactions on Power Delivery*, vol. 14, No. 3, (Jul. 1999), pp. 1115-1123.
Kavitha, M. , et al., "Integration of FACTS into Energy Storage Systems for Future Power Systems Applications", *International Journal of Advanced Research in Electrical, Electronics and Instrumentation Engineering*, vol. 2, Issue 2, (Feb. 2013), pp. 800-810.
Kumbhar, Mahesh M., et al., "Smart Grid: Advanced Electricity Distribution Network", *IOSR Journal of Engineering (IOSRJEN)*, vol. 2, Issue 6, (Jun. 2012), pp. 23-29.
Lambert, Frank C., "Power Flow Control", *ISGT Europe, 2014*, Istanbul, Turkey, (Oct. 13, 2014), pp. 1-15.
Lehmkoster, Carsten , "Security Constrained Optimal Power Flow for an Economical Operation of FACTS-Devices in Liberalized Energy Markets", *IEEE Transactions on Power Delivery*, vol. 17, No. 2, (Apr. 2002), pp. 603-608.
Mali, Bhairavanath N., et al., "Performance Study of Transmission Line Ferranti Effect and Fault Simulation Model Using MATLAB", *International Journal of Innovative Research in Electrical, Electronics, Instrumentation and Control Engineering*, vol. 4, Issue 4, (Apr. 2016), pp. 49-52.
Mutale, Joseph , et al., "Transmission Network Reinforcement Versus FACTS: An Economic Assessment", *IEEE Transactions on Power Systems*, vol. 15, No. 3, (Aug. 2000), pp. 961-967.
Ramchurn, Sarvapali D., et al., "Putting the 'Smarts' into the Smart Grid: A Grand Challenge for Artificial Intelligence", *Communications of the ACM*, vol. 55, No. 4, (Apr. 2012), pp. 86-97.
Reddy, D. M., et al., "FACTS Controllers Implementation in Energy Storage Systems for Advanced Power Electronic Applications—A Solution", *American Journal of Sustainable Cities and Society*, Issue 2, vol. 1, (Jan. 2013), pp. 36-63.
Renz, B. A., et al., "AEP Unified Power Flow Controller Performance", *IEEE Transactions on Power Delivery*, vol. 14, No. 4, (Oct. 1999), pp. 1374-1381.
Ribeiro, P. , et al., "Energy Storage Systems", Chapters 1-2.4 of Section entitled "Energy Storage Systems" in Electrical Engineering—vol. III, edited by Kit Po Wong, Encyclopedia of Life Support Systems (EOLSS) Publications, (Dec. 13, 2009), 11 pp. total.
Schauder, C. D., et al., "Operation of the Unified Power Flow Controller (UPFC) Under Practical Constraints", *IEEE Transactions on Power Delivery*, vol. 13, No. 2, (Apr. 1998), pp. 630-639.
Siemens Sas, "Portable Power Solutions, "Plug and play" High Voltage E-Houses, skids and mobile high voltage substations up to 420 kV", (Nov. 2015), 8 pp. total.
Swain, S. C., et al., "Design of Static Synchronous Series Compensator Based Damping Controller Employing Real Coded Genetic Algorithm", *International Journal of Electrical, Computer, Energetic, Electronic and Communication Engineering*, vol. 5, No. 3, (2011), pp. 399-407.
Xue, Yiyan , et al., "Charging Current in Long Lines and High-Voltage Cables—Protection Application Considerations", *67th Annual Georgia Tech Protective Relaying Conference*, Atlanta, Georgia, (May 8-10, 2013), pp. 1-17.
"Office Action dated Nov. 3, 2017; U.S. Appl. No. 15/157,726", dated Nov. 3, 2017.
"Office Action dated Apr. 6, 2018; U.S. Appl. No. 15/055,422", dated Apr. 6, 2018.
"Office Action dated Apr. 6, 2018; U.S. Appl. No. 15/157,726", dated Apr. 6, 2018.
"Office Action dated Feb. 9, 2018; U.S. Appl. No. 15/345,065", dated Feb. 9, 2018.

\* cited by examiner

Section X-X of 401B

Fig. 5C

Section Z-Z of 401C

VOLTAGE OR IMPEDANCE-INJECTION METHOD USING TRANSFORMERS WITH MULTIPLE SECONDARY WINDINGS FOR DYNAMIC POWER FLOW CONTROL

CROSS-REFERENCE TO RELATED APPLICATIONS

This application claims the benefit of U.S. Provisional Patent Application No. 62/264,744 filed Dec. 8, 2015.

BACKGROUND OF THE INVENTION

1. Field of the Invention

The present invention relates to systems and methods for dynamic line balancing of high-voltage (HV) transmission lines using spatially distributed active impedance-injection modules that are connected directly in series with the HV transmission lines that form HV electric power grids.

2. Prior Art

HV electric power grids typically operate at voltages that are on the order of about 50 kV up to about 600 kV. One of the requirements of these HV power grids is the need for dynamic distributed active power-flow control capability that can inject both inductive and capacitive impedance on to the HV transmission line as required to achieve line balancing and phase angle correction. A system that can react fast to the problems of power flow over the grid, will greatly improve the grid operation and power-transfer efficiency.

Congested networks limit system reliability and increase the cost of power delivery by having part of the power dissipated in unbalanced circuits causing loop currents with associated power loss. In addition, substantially out-of-phase voltages and currents on the transmission lines reduce the capacity of the lines to transfer real power from the generator to the distribution substation. To remove this limitation, it is desired to have HV power grids with transmission lines that are balanced, with power transfer shared substantially per optimization methods, with reasonable power factor, and controllable phase difference between voltage and currents. These improvements reduce the loop currents and associated losses and enable real power transfer over the grid up to the capacity of the lines.

Most of the grid control capabilities today are ground based and installed at substations with switchable inductive and capacitive loads. These installations require high-voltage insulation and high-current switching capabilities. Being at the substations these can use methods of cooling that include oil cooling, forced recirculation of coolant, and other options without consideration of the weight and size of the units. These lumped controls require a centralized data collection and control facility to coordinate operation across the grid and hence have associated delays in implementing the control function on the power grid.

Distributed and active control of transmission line impedance, if effectively implemented with high reliability, improves the system efficiency substantially, but requires cost-effective implementations that can alter the impedance of the HV transmission lines, with fast identification and fast response to line balance issues, by changing the phase angle of the current-voltage relationship applied across the line, thus controlling power flow.

Figure 1:
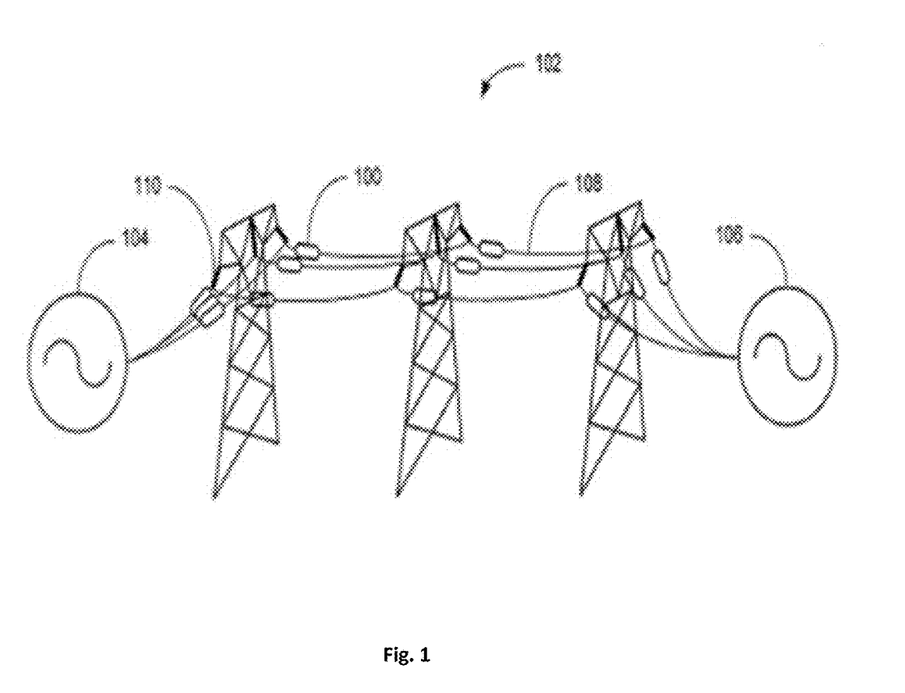
FIG. 1 is a representation of a high-voltage transmission line showing distributed passive impedance-injection modules attached directly to the HV transmission line. (prior art)

At present proven effective and reliable solutions for distributed control of the power grid as, for example, described in U.S. Pat. No. 7,835,128 to Divan et al (the '128 patent) are limited. FIG. 1 shows a representation of the present-day distributed line balancing system 102 using a "distributed series reactor (DSR)" 100 using a passive impedance-injection module.

Power is transmitted from the electric power source or generator 104 to the load or distribution substation 106. Spatially distributed passive inductive impedance-injection modules (or DSR 100) are directly attached to the power conductor on the HV transmission line 108, and hence form the primary winding of the DSR 100 with a secondary winding having a bypass switch that, when open, inject an inductive impedance on to the line for distributed control. These DSR 100s only provide a limited amount of control by injecting only the inductive impedance on to the line. When the secondary winding is shorted by the bypass switch, the DSR 100 is in a protection mode and injects substantially zero impedance on to the HV line.

Figure 2:
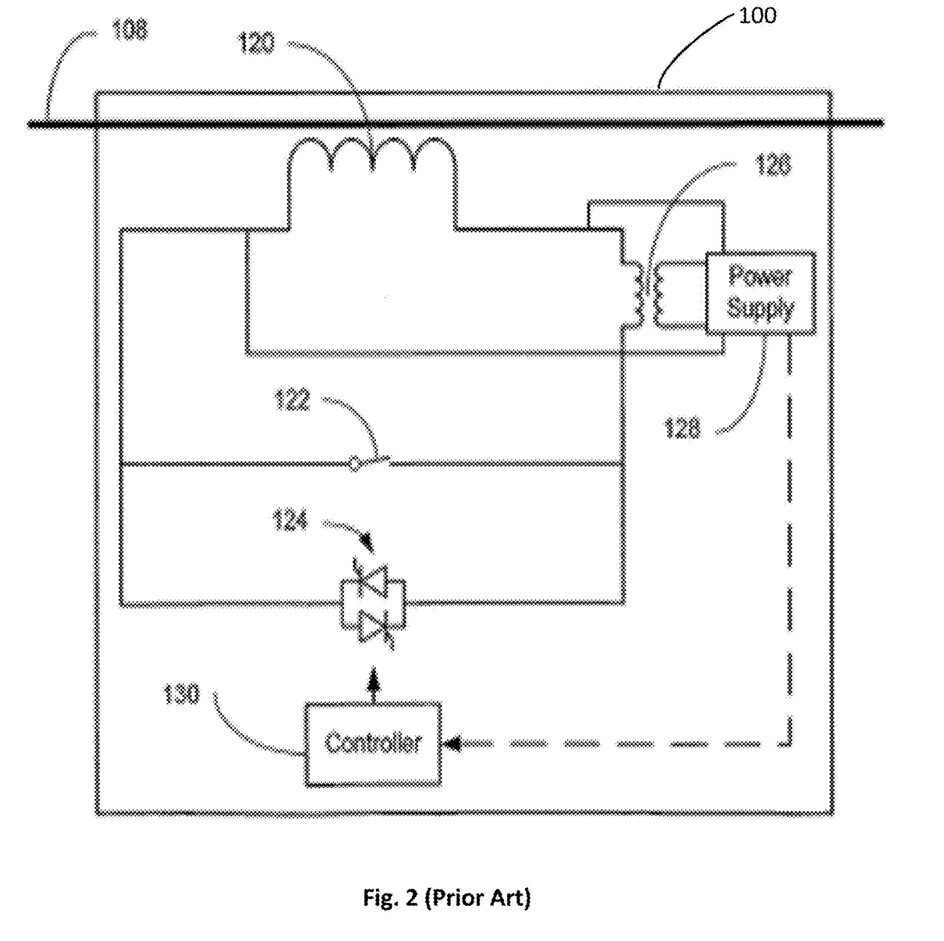
FIG. 2 is an exemplary block diagram of an inductive impedance-injection module using a single-turn transformer for distributed inductive-impedance injection on a HV transmission line. (prior art)
Figure 2A:
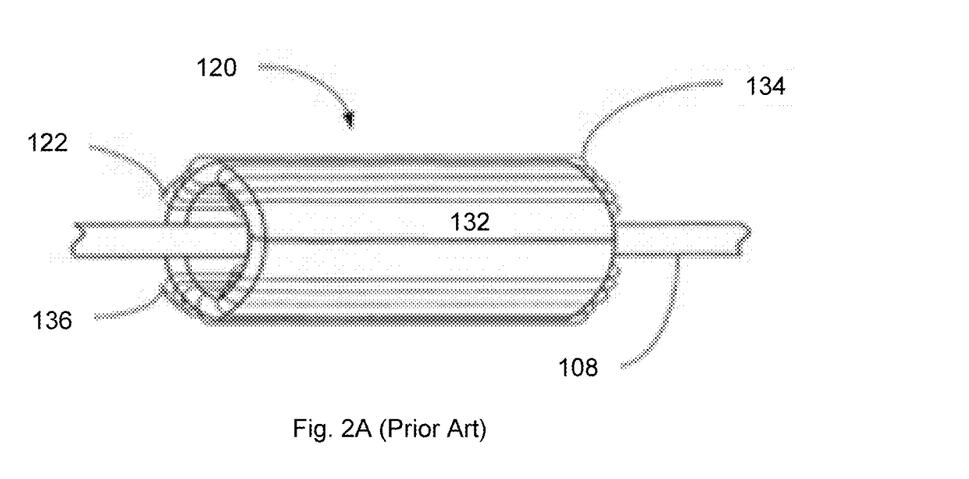
FIGS. 2A and 2B are exemplary schematics of the single-turn transformer used in the passive impedance-injection module of FIG. 2 (Prior Art)
Figure 2B:
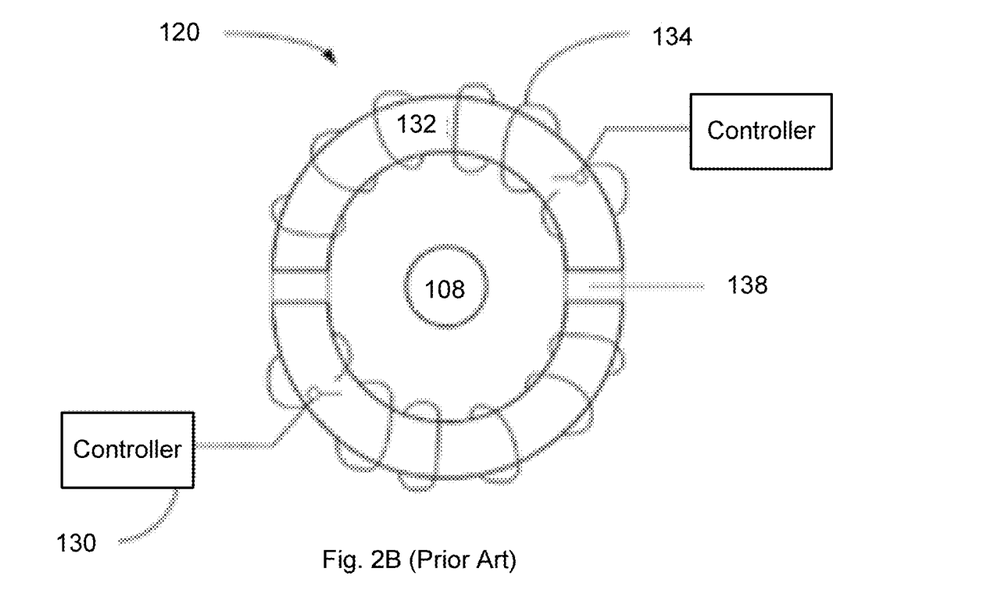

FIGS. 2 and 2A and 2B show embodiments of a passive impedance-injection module DSR 100. The HV transmission line 108 is incorporated into the module as the primary winding by adding two (or more) split-core sections 132, that are assembled around the HV transmission line 108. The core sections 132 are attached to the HV transmission line 108 with an air gap 138 separating the sections after assembly. The air gap 138 is used to set a maximum value of fixed inductive impedance that is to be injected on the HV line via the primary winding. Secondary winding 134 and 136 encircles the two split-core sections 132 and enabled the bypass switch 122 to short out the secondary winding and prevent injection of inductive impedance on to the a HV transmission line 108 and also provide protection to the secondary circuits when power surges occur on the HV transmission line. The split core sections 132 and the winding 134 and 136 comprise the single-turn transformer (STT) 120. A power supply module 128 derives power from the secondary windings 134&136 of the STT 120 via a series connected transformer 126. The power supply 128 provides power to a controller 130. The controller 130 monitors the line current via the secondary current of the STT 120, and turns the bypass switch 122 off when the line current reaches and exceeds a predetermined level. With the contact switch 122 open, a thyristor 124 may be used to control the injected inductive impedance to a value up to the maximum set by the air gap 138 of DSR 100.

When using multiple DSRs 100 connected on the HV transmission line as in FIG. 1, the inductive impedance injected by all the DSRs 100 on the line segments provides the total control impedance. The main reason for the choice and use of inductive impedance injection unit DSR 100 is its simplicity, inexpensiveness, and reliability as it does not need active electronic circuits to generate the needed inductive impedance. The value of the inductive impedance of each DSR 100 is provided by the air-gap setting of the transformer core and not electronically generated, and hence has fewer failure modes than if the same was implemented using electronic circuits. The difficulty in implementing and using electronic circuits for impedance injection units that can produce an actively controllable high impedance for injection comprising both inductive and capacitive impedance is multi fold. It includes achieving the long-term reliability demanded by electric utilities while generating the voltage and current levels that are needed to achieve effective active control of the lines in the secondary circuit while remaining within reasonable cost limits for the module.

Figure 3:
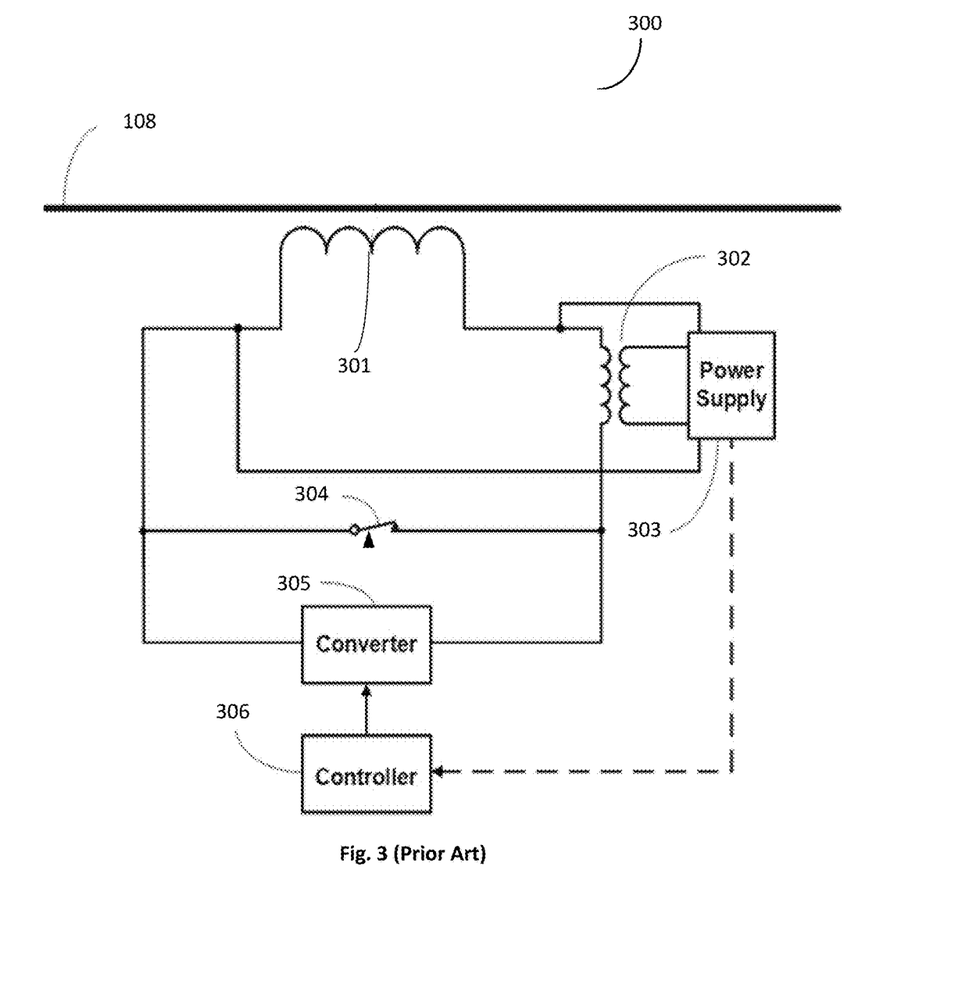
FIG. 3 is an exemplary block diagram of an active impedance-injection module, licensed to the current entity, using a single-turn transformer for distributed active impedance-injection on to a HV transmission line. (Prior Art)

Distributed active impedance-injection modules on high voltage transmission lines have been proposed in the past. U.S. Pat. No. 7,105,952 of Divan et al. licensed to the applicant entity is an example of such. FIG. 3 shows an exemplary schematic of an active distributed impedance-injection module 300. These modules 300 are expected to be installed in the same location on the HV power line as the passive impedance-injection modules (or "DSR" 100) shown FIG. 1. The active impedance-injection module 300 does not perform the same functions. In fact the active impedance-injection module 300 does not have a gapped core 132 of FIG. 2B that provides the fixed inductive impedance. Instead the inductive or capacitive impedance is generated using the converter 305 based on the sensed HV transmission line 108 current. The sensing of the magnitude of the line current is done by sampling the secondary current by the series-connected secondary transformer 302. The sensing and power supply block 303 connected to the secondary transformer 302 extracts the HV transmission line current information and feeds the controller 306. The controller based on the received input provides the necessary commands to the converter 305 to generate the required inductive or capacitive impedance to adjust the line impedance. The value of the impedance in this case is not fixed but varies according to the status of the measured current on the HV transmission line. Hence the system using spatially distributed active impedance-injection modules 300 provides for a much smoother and efficient method for balancing the grid.

In practice the active impedance-injection modules 300s have not been practical due to reasons of cost and reliability. In order to inject the needed impedances on to the HV transmission line for providing reasonable line balancing there is a need to generate a significant amount of power in the converter circuits. This has required the active impedance-injection modules 300 to use specialized devices with adequate voltages and currents ratings.

The failure of a module in a spatially distributed inductive impedance injection line balancing system using DSR 100 modules inserts a fixed inductive impedance set by the "air gap" 138 or substantially zero impedance on to the line. Failure of a few modules out of a large number distributed over the HV transmission line does not mandate the immediate shutdown of the line. The repairs or replacement of the failed modules can be undertaken at a time when the line can be brought down with minimum impact on the power flow on the grid. For utilities to implement distributed active line balancing, the individual modules must be extremely reliable. They also have to be cost effective to be accepted by the Utilities.

Power transmission line balancing circuits have been limited to the use of delayed-acting heavy-duty fully-insulated oil-cooled inductive and capacitive impedance injectors or phase-shifting transformers prone to single-point failures, located at substations where repairs of these failed units can be handled without major impact on power transfer over the grid.

As described above the use the specialized devices that can handle the needed power with high reliability demanded by the utilities at a reasonable cost has not been possible so far. There is a need for such a capability for converting the grid to a more efficient and intelligent system for power distribution. If it can be established, it will have a major impact on the efficiency and capabilities of the grid.

BRIEF DESCRIPTION OF THE DRAWINGS

The drawings are meant only to help distinguish the invention from the prior art. The objects, features and advantages of the invention are detailed in the description taken together with the drawings.

DETAILED DESCRIPTION OF THE PREFERRED EMBODIMENTS

As discussed above there is a need to have high-reliability, fault-tolerant and intelligent distributed dynamic-control modules (distributed active impedance-injection modules) with capability to inject both inductance and capacitive impedances of sufficient and appropriate magnitude on to high-voltage transmission lines to enable power flow control. These distributed dynamic control modules have to be directly attached to the HV transmission line and are at line potential while in operation. The distributed dynamic-control modules are enabled to operate by extracting power from the HV transmission line for control and for generating the necessary converter voltages. The modules generate and inject voltages at the right phase angle for injection on to the HV transmission line to provide the necessary inductive or capacitive impedance during operation.

The secondary side of the single turn transformer and all associated circuitry are electrically isolated from the ground. However, one side of the secondary winding is connected to the primary winding to provide a virtual ground or "floating ground" reference.

In order for the distributed control modules to be successfully accepted by utilities and installed on lines these distributed control modules have to be smart and self-aware, remotely controllable and configurable. The modules should be of a reasonable weight compared to the line segment over which these are to be installed, even where the modules are suspended in an insulated fashion from the towers or are supported by additional support structures. These should also have a low wind resistance to reduce the effect of wind loading on the line/tower/special support structure employed. As an essential feature all the electronic components and circuits of the module should have very high reliability to reduce the probability of down times due to failure of the modules/components used therein.

Invention: The invention disclosed is generally directed at providing very high-reliability distributed active control capability for power-flow balancing across the multiple high-voltage lines used for power transmission on the high-power grid system that overcomes the issues of the prior art implementations.

There are multiple needs that have been defined for achieving the use of distributed control that need changes from the prior art implementations. These are:

1. The need is to have a distributed module that can generate and supply the required range of inductive and capacitive impedances (generating the necessary leading or lagging voltages with respect to the line current) to the transmission line to provide the necessary control for line balancing.
2. Provide the above capability at a reasonable cost point—preferably by using standard off-the-shelf power-electronics components; this means that the secondary winding and associated circuits operate at voltages and current levels normally seen in high-volume power-electronic applications. Using off-the-shelf power electronic components means using general purpose power electronic components that are also manufactured and sold in the normal course of business for other uses.
3. The third is the need for reliability of the distributed modules to be high enough to eliminate failures and related replacements to an acceptable level for the Utilities—This is achievable if standard power electronics components, with known reliability can be used in the secondary circuits.
4. The final need is to have relatively low weight and wind-related cross section for the module to be attached to the HV transmission line with minimum extra support.

The disclosed invention provides for improvement in all the above aspects in the embodiments disclosed below:

The prior art dynamic injection modules had problems which prevented their acceptance. One was the need for specialized components for the generation of the magnitude of injection power (voltage and current) needed to be generated to provide adequate control of the HV transmission line segment where the module is attached. The second was the lack of reliability due to the modules handling high power levels which again necessitated specially tested and qualified component use. Both the above requirements resulted in the cost of the module also being very high for use by utilities.

The invention uses of a plurality of secondary windings with individual voltage converters that are used to generate voltages of the correct polarity and amplitude to be impressed on the high-voltage power-lines. The distributed impedance-injection modules comprising the plurality of injector blocks that enable generation and injection of the right impedance, inductive or capacitive as required, for dynamic line balancing is disclosed. These distributed impedance injection-modules are direct attached to the HV transmission lines at the towers or at special support structures that can help support the weight of the modules.

In the distributed module that is to be attached to the HV transmission line at the secondary side of the transformer and all associated circuitry are electrically at line voltage and isolated from ground. One side of the secondary winding is connected to the primary winding to provide a virtual ground or "floating ground" reference.

By using multiple secondary windings, each injecting an impedance onto the HV transmission line, the total necessary cumulative voltage for correction of the phase angle can be impressed on the segment of the grid without unduly stressing the circuits associated with each of the secondary windings of the distributed impedance-injector module.

Figure 4:
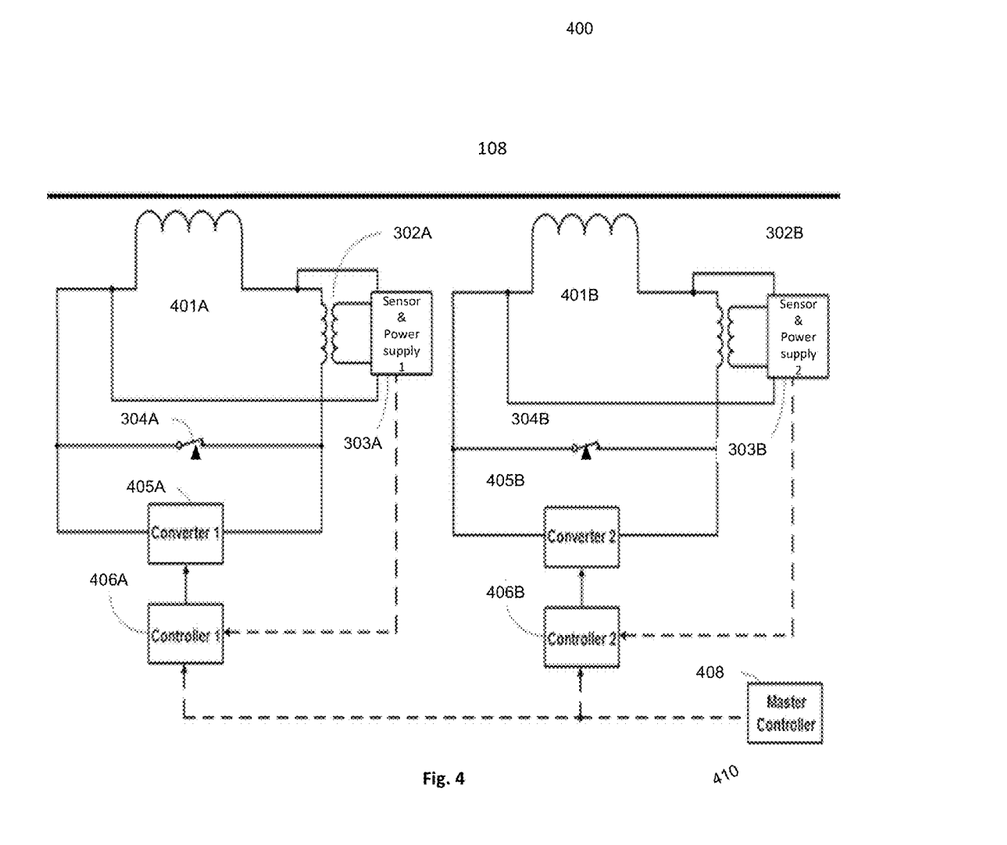
FIG. 4 is an exemplary block diagram of a first embodiment of the disclosed active impedance-injection module using a plurality of secondary windings for distributed active impedance injection on a HV transmission line.

The current invention addresses the advantages and features of the distributed module with multiple secondary windings and associated core segments with associated voltage converters/inverters to address the problem of actively injecting inductive and capacitive impedances in line segments. The voltage converter or simply converter 405 may be of any appropriate design, as such devices of various designs are well known in the art. Typically such devices are configured to inject an inductive load onto the high voltage transmission line, and may also have the capability of injecting a capacitive load on the transmission for power factor control, and may further be capable of controlling harmonic content in the high voltage transmission line. Such devices are also known by other names, such as by way of example, inverters or converters/inverters. An exemplary device of this general type is the combination of the inverter 71 and energy storage 74 of U.S. Pat. No. 7,105,952, though many other examples of such devices are well known. These devices typically act as active impedances to controllably impose the desired impedance onto the high voltage transmission line. Also preferably the controller 410 used in the preferred embodiments includes a transceiver for receiving control signals and reporting on high voltage transmission line conditions, etc.

The use of multiple windings and multiple circuits to generate the necessary injection power enables reduction in the operating voltage of the components used. The resulting lower voltage, due to use of multiple secondary windings per transformer, enables the units to use a more cost-effective design, while using highly reliably mass-produced semiconductors and other power-electronics components. Further using a distributed approach allows for significantly greater "N+X" system reliability, where N is the number of distributed modules required to achieve a desired line balancing capability, and X is the number of extra redundant modules. Therefore, with ensuring the reliability of each unit by carefully selecting the number and type of secondary windings, by carefully matching mass-produced semiconductor devices and other components used, the added extra redundant distributed active-impedance control modules provide an additional layer of "system" reliability over and above the unit reliability. This in turn results in distributed injection modules of high reliability, capable of providing very high system reliability, acceptable to the utilities. The use of the distributed impedance-injection modules are enablers for providing the capability to balance the power transmitted over the HV-transmission-lines of the power grid.

FIG. 4 is a block diagram 400 of a first embodiment of the current invention having a plurality of injector blocks. Each injector block is coupled to the HV transmission line via a secondary winding of a single-turn transformer. The FIG. 4 shows two exemplary injector blocks 400A and 400B. FIG. 5A shows the schematic of the implementation of the single-turn transformer in FIG. 4 and FIG. 5C shows the cross section of the single-turn transformer. The exemplary injector blocks 400A and 400B are shown, each having a single turn of primary winding transformer 401A and 401B. The primary winding of these transformers comprise the HV transmission line 108. The secondary winding 401A-2 of the injection transformer 401A and the secondary winding 401B-2 of the injection transformer 401B shown in FIGS.

5A and 5C are electrically isolated from ground and the primary winding but inductively coupled to the primary winding 108 using independent un-gapped cores 407A and 407B as shown in FIG. 5A.

The secondary circuits of each of the injection transformers 401A and 401B comprise power-electronic circuits for generation and injection of the inductive and capacitive impedances (or equivalent voltages) onto the HV transmission line 108. For example, the secondary winding circuit of the injector block 400A having the single-turn injection transformer 401A, comprises of a shorting switch 304A, a power converter 405A for generating the necessary voltages and currents at the appropriate phase angle for injecting on to the HV transmission line 108 via the single-turn injection transformer 401A. A controller 406A is enabled to sense the HV transmission line 108 current and voltage characteristics through a sensor and power-supply transformer 302A connected to a sensor and power supply module 303A. The controller 406A provides the needed control instructions to the power converter 405A to generate the needed injection voltages to be impressed on the HV transmission line for power-flow control. The controller 406A is also enabled to sense via the sensor and power supply transformer 302A and the connected sensor and power supply module 303A, when over-current conditions exist in the HV transmission line and to provide instruction to the switch 304A to short the secondary winding 401A-2 of the injection transformer 401A. This is done in order to protect the power electronic circuits and components connected to the secondary winding 401A-2 of the injection transformer 401A from damage due to high voltages and currents. The sensor and power supply module 303A are also enabled to extract power from the line and provide the DC supply voltages needed by the power-electronics circuits connected to the secondary winding 401A-2 of the injection transformer 401A. The same set of components and blocks are repeated for the same functionality implemented by the second injector block 400B. A master control block 408 coordinates and synchronizes the operation of the secondary controllers 406A and 406B to provide the corrective impedance injection. The master controller 408 also provides the capability for the module containing the plurality of injection blocks for communicating to the outside world as well as other distributed modules, to provide status and control information. The communication capability is also used for external control and configuration of the module.

Figure 5:
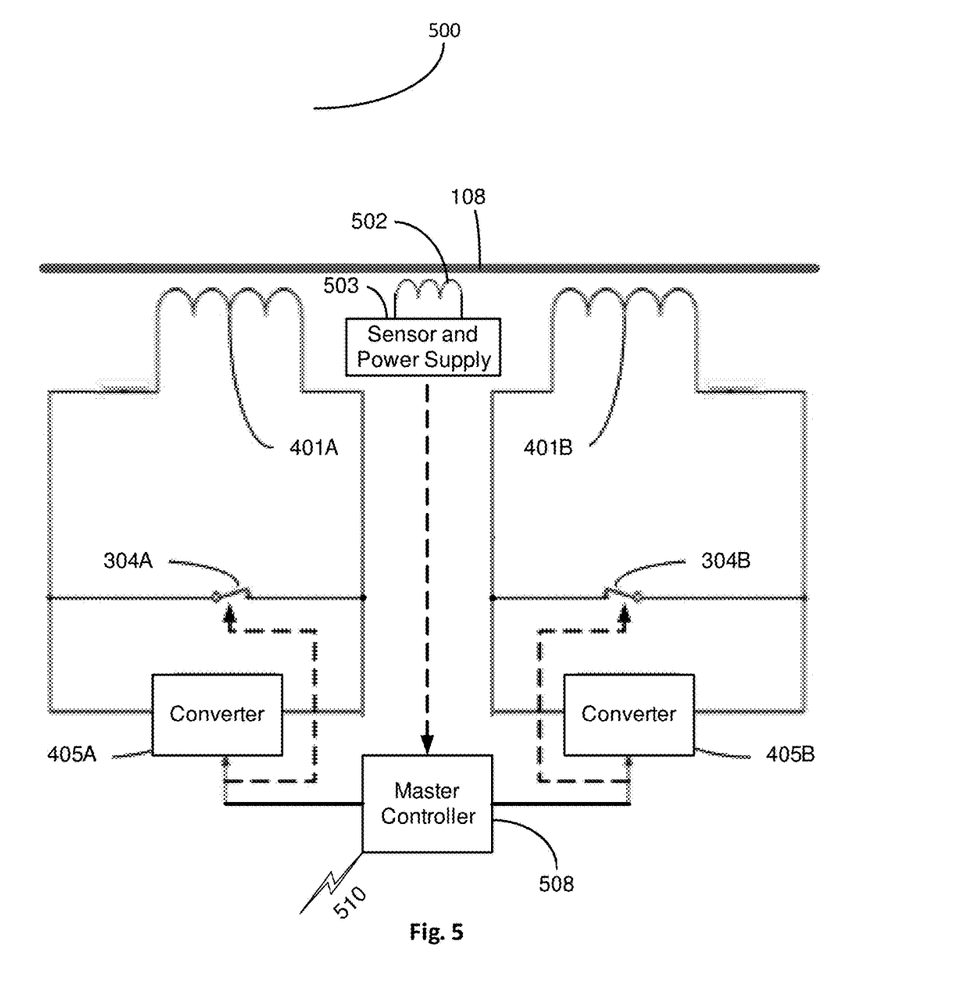
FIG. 5 is an exemplary block diagram of a second embodiment of the disclosed active impedance-injection module using a plurality of secondary windings for distributed active impedance injection on a HV transmission line.
Figure 5A:
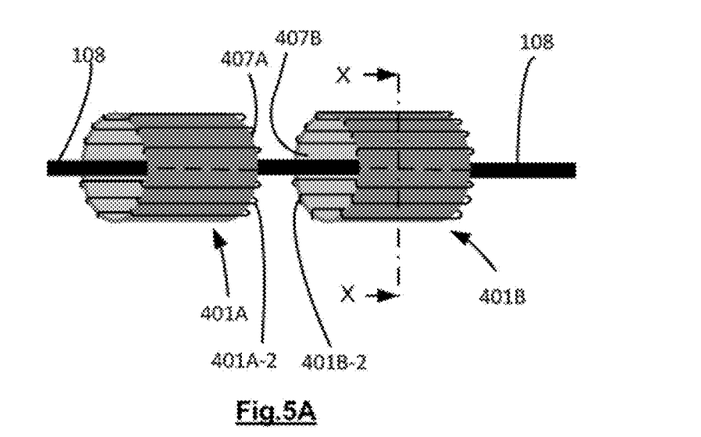
FIGS. 5A and 5B are exemplary schematics of the multi-secondary single primary-turn transformer.

FIG. 5 shows a second alternate embodiment of the disclosed invention having a plurality of secondary windings each associated with an impedance-injector block. The two exemplary injection blocks similar to the previous embodiment 400A and 400B are shown in FIG. 5. The exemplary injector blocks 400A and 400B are shown, each have a single-turn of primary winding transformer 401A and 401B. The primary winding of these transformers is the HV transmission line 108. The secondary winding 401A-2 of the injection transformer 401A and the secondary winding 401B-2 of the injection transformer 401B are shown in FIG. 5A. The cross section of the single-turn transformer is shown in FIG. 5C. (The transformer shape might be different as shown here. Regardless of the specific transformer shape employed, the invention provides the same value. Therefore the respective shape shown is only for exemplary purposes.) The secondary windings of the transformers are electrically isolated from ground, being at the HV transmission line voltage, and are inductively coupled to the primary winding 108 using independent un-gapped cores 407A and 407B as shown in FIG. 5A.

The secondary circuit of each of the injection transformers 401A and 401B comprise power-electronic circuits for generation and injection of the inductive and capacitive impedances on to the HV transmission line 108. Each of the secondary winding circuits of the injector blocks 400A and 400B are similar in structure and as such, the block diagram is explained using the injector block 400A. The injector block 400A has a single-turn injection transformer 401A, having a shorting switch 304A across its secondary winding 401A-2 and a power converter 405A for generating the necessary voltages and currents at the appropriate phase angle for injecting on to the HV transmission line 108 via the single-turn injection transformer 401A coupled to it. A master controller 508 is common to all the injector blocks and is enabled to sense the HV transmission line 108 current and voltage characteristics through a sensor and power-supply transformer 502 coupled to the HV transmission line 108 via a sensor and power supply module 503. The master controller 508 provides the needed control instructions to the power converter 405A to generate the needed injection voltages to be impressed on the HV transmission line 108 for line balancing. (In other embodiments, the respective converter/inverter controllers may provide alternate redundant master-controller architectures. Therefore, the specific embodiment shown here is only representative.) The controller 508 is also enabled to sense via the sensor and power supply transformer 502 and the connected sensor and power supply module 503 when over-current conditions exist in the HV transmission line and to provide instruction to the switch 304A to short the secondary winding 401A-2 shown in FIG. 5A of the injection transformer 401A in order to protect the power-electronic circuits and components connected to the secondary winding 401A-2 of the injection transformer 401A from damage due to high voltages and currents. The sensor and power supply module 503 is also enabled to extract power from the line and provide the DC supply voltages needed by the power-electronics circuits connected to the secondary winding 401A-2 of the injection transformer 401A. As discussed before the same set of components and blocks are be repeated for the same functionality implemented by the second injection block 400B. The master controller 508 also provides the capability for the module containing the plurality of injection blocks for communication to the outside world to provide status and to be externally controlled and configured for operation.

Figure 5B:
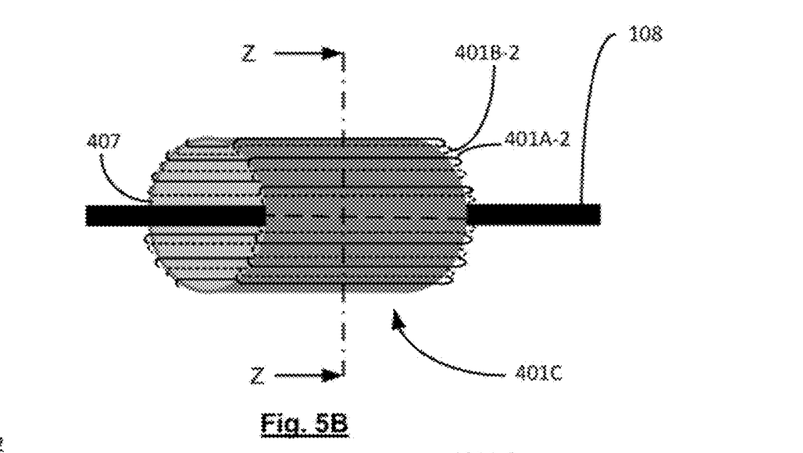
Figure 5C:
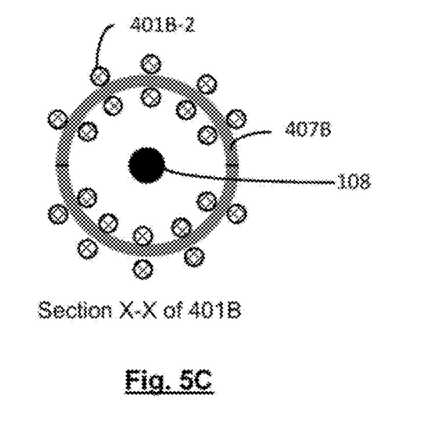
FIGS. 5C and 5D show the cross sections of the transformers in FIGS. 5A and 5B.
Figure 5D:
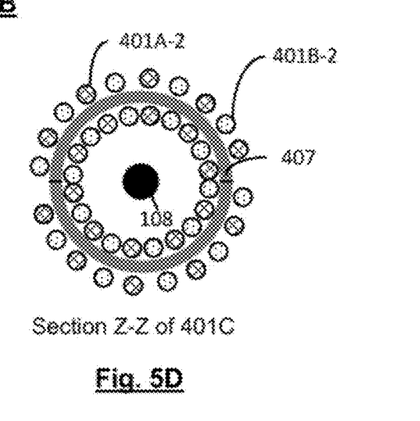

FIG. 5B and cross section FIG. 5D show an alternate way to implement the single-turn injection transformer 401C. A single non-gapped core 407 is enabled to carry the plurality of secondary windings. Two secondary windings 401A-2 and 401B-2 are shown as per the exemplary block diagrams in FIG. 4 and FIG. 5. The single-turn injection transformers provide the coupling necessary to impress the generated impedance on to the HV transmission line 108.

Having a plurality of secondary windings with associated power electronic circuits, each generating a part of the injection voltage allow each injector block, such as 400A and 400B of the module to output a portion of the required injectable impedance to control the impedance of the line while enabling the distributed injection module 400 to generate the needed range of injectable impedance (or respective voltage) in a cumulative fashion from the plurality of injector blocks to be impressed on the HV transmission line 108. Hence the power-electronic circuits within the secondary injector blocks 400A and 400B are able to operate without undue stress at voltages that are normal for these components when a plurality of such blocks are used in a module to generate the needed impedance (or respective voltage). This provides for improved reliability of the components and hence the injection block and the module as a whole. The use of a plurality of secondary windings with associated injector blocks also enable lower voltages and currents to be used in the individual injector blocks. By using a sufficient number of such injector blocks it is possible to use off-the-shelf components with known operational characteristics and reliability and achieve a lower manufactured cost point for the module as a whole. In essence, the multiple secondary windings are electrically equivalent to a single secondary winding with a multiple of the voltage value of the single winding wherein such a single secondary winding would need a higher power output converter than used in the present invention, with the plurality of secondary windings, to impress the same impedance on the power line.

Though only two exemplary secondary blocks 400A and 400B are shown in FIG. 4 and FIG. 5, these should not be considered as limiting. A plurality of injector blocks, within an injection module 400, similar to the blocks 400A and 400B can be implemented in an impedance-injection module. Each injector block associated with a secondary winding of the single-turn transformer and capable of injecting a small portion of the overall inductive or capacitive impedance needed for HV transmission line control. By injecting a voltage and current component with the correct phase angle onto the coupled HV transmission line, from each of the plurality injection blocks, such as 400A and 400B, of the module 400, the module can be used to provide the full cumulative distributed control capability for the line segment of the power grid. Hence by having a plurality of the distributed modules spatially distributed over the grid, each having a plurality of secondary injection modules coupled to the HV transmission line via single-turn transformers, the whole grid can be balanced and optimized for power transfer.

Figure 6:
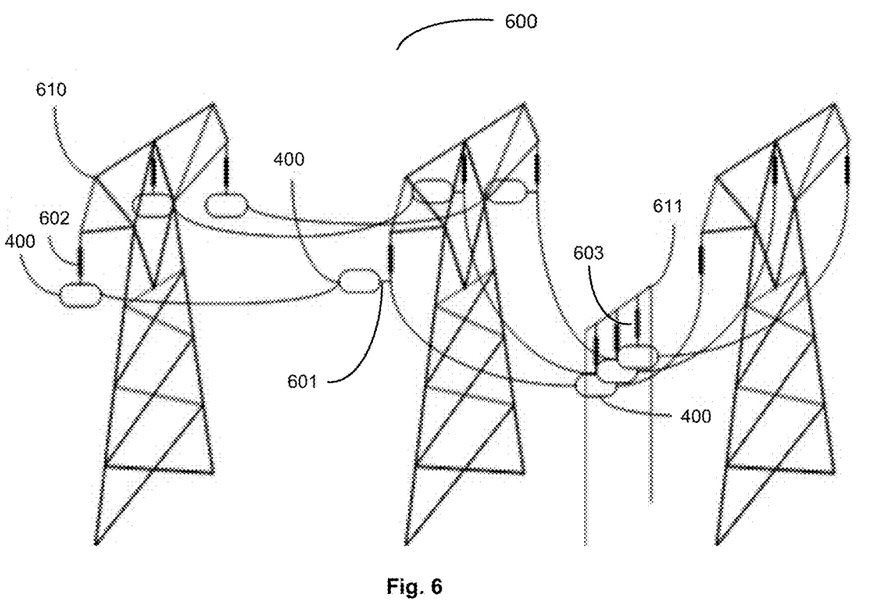
FIG. 6 is a representation of a high-voltage transmission line showing various ways the distributed active impedance-injection modules are to be supported while being directly attached to the HV transmission lines and operating at line voltage as per the embodiments of the invention.

As discussed before by having a plurality of secondary windings with associated injector blocks for an injection module, each injection block with its own power-electronic control and converter capability, the weight and the wind cross section of the module may be higher. It should be understood that all the associated circuits of the module are enclosed in a housing, which is suspended insulated from ground at the HV transmission line voltage. Due to weight considerations it is preferable to have these modules suspended from the towers or provide additional support for attachment. FIG. 6 shows the typical attachment methods 600 possible for supporting the injection modules 400 or injection module 500 connected to the HV-transmission-lines. The on-line attachment 601, is the typical prior art attachment used for the static modules, which connects the module to the line directly, with no additional support and let the line supports take the weight of the module and the line. Though this is acceptable, this type of attachment is not the preferred one for the injector modules 400 of the current invention. The preferred attachment for these injector modules 400 for distributed control are with additional support as shown. Directly connected by supporting insulators 602 on the HV transmission towers 610 or by using special support structures 611 with insulated supports 603 for providing the distributed module additional weight carrying capability. The use of the above support methods are also oriented towards improved reliability of the structures during extreme climatic disturbances.

Even though the invention disclosed is described using specific implementation, it is intended only to be exemplary and non-limiting. The practitioners of the art will be able to understand and modify the same based on new innovations and concepts, as they are made available. The invention is intended to encompass these modifications.

What is claimed is:

1. An active impedance-injection module for distributed dynamic line balancing of a high-voltage transmission line comprising:
    a transformer having a transformer core, the transformer core having a plurality of secondary windings thereon;
    a plurality of converters, each coupled to a respective secondary winding; and
    a controller coupled to each converter;
    the transformer, the converters and the controller all being packaged in a single housing for use with a high-voltage transmission line passing through the transformer core, thereby forming a transformer with a single-turn primary and the plurality of secondary windings.

2. The module of claim 1 wherein the transformer core is a split core, whereby the housing may be opened and the split core disassembled to receive the high-voltage transmission line.

3. The module of claim 2 wherein the transformer core, once positioned with the high voltage transmission line in place, may be assembled with no gap at a split of the split core.

4. The module of claim 1, the module further comprising a plurality of bypass circuits, each bypass circuit being coupled to a respective secondary winding.

5. The module of claim 1 wherein the controller is coupled to control each converter independently of its control of any other converter, whereby each controller may operate no converters, all converters, or any subset of converters at any one time.

6. The module of claim 5 wherein the controller controls each converter through a plurality of additional controllers, each associated with a respective converter.

7. The module of claim 1 wherein a number (N) of secondary windings are selected to achieve a coupling capability to and from the high-voltage transmission line equal to a transformer having an N-turn primary and a single converter.

8. The module of claim 1 wherein a number (N) of secondary windings and converters used in the module are selected to reduce each secondary voltage and converter power needed to provide a coupling equal to that of a module having a single secondary-winding transformer using high-voltage components in its converter made specially for individual customers, whereby general purpose power electronic components that are also manufactured and sold for other uses may be used in the modules.

9. For use in an active impedance-injection module for dynamic line balancing of a high-voltage transmission line, an improvement comprising:
    a transformer having a transformer core, the transformer core having a plurality of secondary windings thereon;
    a plurality of converters, each coupled to a respective secondary winding; and
    a controller coupled to each converter;
    the transformer core being a split core, whereby the split core is assembled around a high-voltage transmission line in place;
    wherein the active impedance injection module itself is at the potential of the high voltage transmission line.

10. The improvement of claim 9 wherein the transformer core, once positioned with the high voltage transmission line in place, may be assembled with no gap at a split of the split core.

11. The improvement of claim 9 further comprising a plurality of bypass circuits, each bypass circuit being coupled to a respective secondary winding.

12. The improvement of claim 9 wherein the controller has control of each converter independently of the controller's control of any other converter, whereby the controller may operate no converters, all converters, or any subset of converters at any one time.

13. The improvement of claim 12 wherein the controller controls each converter through a plurality of additional controllers, each associated with a respective converter.

14. The improvement of claim 9 wherein a number (N) of secondary windings and converters is selected to achieve a coupling capability to and from the high-voltage transmission line equal to a transformer having an N-turn primary and a single converter.

15. The improvement of claim 9 wherein a number (N) of secondary windings and converters used is selected to reduce each secondary voltage and converter power needed to provide a coupling equal to that of a module having a single secondary winding transformer and using high-voltage components in its converter made specially for individual customers, whereby general purpose power electronic components that are also manufactured and sold for other uses may be used in the modules.

16. A method of providing dynamic and distributed line balancing of a high-voltage transmission line comprising:
   providing at least one active impedance-injection module for dynamic line balancing of a high-voltage transmission line, each module having;
      at least one transformer having a split transformer core, enabled for distributed installations over the high voltage transmission line, each transformer core having a plurality of secondary windings thereon, whereby the split core can be assembled around a high-voltage transmission line in place and the impedance injection module is at the potential of the high voltage transmission line to which it is coupled;
      a plurality of converters, each coupled to a respective secondary winding; and
      a controller coupled to each converter;
      the transformer, the converters and the controller all being packaged in a single housing as a module for use with a high-voltage transmission line passing through the transformer core, thereby forming a transformer with a single-turn primary, and the plurality of secondary windings; and
   supporting each module by the transmission lines, directly supporting each module from insulators on a respective high-voltage transmission line support tower or using a respective special support structure.

17. The method of claim 16 wherein each single housing is opened and the respective split core is disassembled for passage of the high-voltage transmission line there through, and then the respective split core is reassembled and the respective single housing is closed.

18. The method of claim 17 wherein the split core is reassembled without a gap at each split of the split core.

19. The method of claim 16 wherein the module further comprises a plurality of bypass circuits, each bypass circuit being coupled to a respective secondary winding.

20. The method of claim 16 further comprising controlling each respective converter independently to operate no respective converters, all respective converters, or any subset of respective converters at any one time.

21. The module of claim 20 wherein the controller controls each converter through a plurality of additional controllers, each associated with a respective converter.

22. The method of claim 16 wherein a number (N) of secondary windings and converters is selected to achieve a coupling capability to and from the high-voltage transmission line equal to a transformer having a N-turn primary and a single secondary winding.

23. The method of claim 16 wherein a number (N) of secondary windings and converters used in the module is selected to reduce each secondary voltage and converter power needed to provide a coupling equal to that of a single secondary winding transformer using custom high-voltage components to allow use of general purpose power electronic components that are manufactured and sold for other uses also.

24. The method of claim 16 wherein the module is at a voltage of the high-voltage transmission line, is insulated from ground and is mechanically supported by the transmission line, a transmission line tower or a special-purpose support structure.

25. The method of claim 16 wherein a plurality N+X of injection modules are used, where N is a number of modules distributed along the high-voltage transmission line required to achieve a desired line balancing capability and X is a number of redundant modules also distributed along the high-voltage transmission line, thereby ensuring reliability.

* * * * *